United States Patent [19]

Goldry et al.

[11] 3,952,384
[45] Apr. 27, 1976

[54] PIPE JACKS

[75] Inventors: Philip Edward Goldry, Northampton; Keith Thomas Skinner, Birmingham, both of England

[73] Assignee: Kelly Bros. (Northampton) Limited, Northampton, England

[22] Filed: Oct. 7, 1974

[21] Appl. No.: 512,501

[30] Foreign Application Priority Data
Nov. 21, 1973 United Kingdom............... 53954/73

[52] U.S. Cl......................... 24/249 HA; 24/249 PP; 254/29 R; 279/4; 279/106
[51] Int. Cl.²......................................... E21B 19/00
[58] Field of Search..... 24/249 R, 249 WL, 249 FP, 24/249 LS, 249 LL, 249 SL, 249 PP, 249 DC, 249 DP, 263 DA, 263 DH, 263 DG, 249 HA, DIG. 26; 61/72.7, 72.5; 254/29 R, 30; 269/238, 104, 237; 279/106, 4, 35; 81/57.19, 57.2

[56] References Cited
UNITED STATES PATENTS

| | | |
|---|---|---|
| 460,883 | 10/1891 | Nugent .......................... 269/238 X |
| 1,052,091 | 2/1913 | Robertson ......................... 279/106 |
| 1,179,500 | 4/1916 | Brown ....................... 24/249 DP X |
| 1,391,804 | 9/1921 | Steen ............................. 24/249 DP |
| 1,536,413 | 5/1925 | Thrift ............................ 24/263 DA |
| 1,634,422 | 7/1927 | Holmes........................... 24/249 WL |
| 1,772,210 | 8/1930 | Dale............................... 24/DIG. 26 |
| 1,788,542 | 1/1931 | Page .............................. 24/249 DP |
| 2,667,356 | 1/1954 | Foward ......................... 279/106 X |
| 2,832,604 | 4/1958 | Le Brusque............................. 279/4 |
| 3,149,851 | 9/1964 | Adams ..................................... 279/4 |
| 3,396,980 | 8/1968 | Müller ............................ 279/106 X |
| 3,726,506 | 4/1973 | Vanderwaal et al............. 254/29 R |
| 3,834,668 | 9/1974 | Casey .............................. 254/29 R |
| 3,861,252 | 1/1975 | Stoffels et al. ...................... 279/4 X |

FOREIGN PATENTS OR APPLICATIONS
892,473   3/1962   United Kingdom..................... 279/4

*Primary Examiner*—Roy D. Frazier
*Assistant Examiner*—Rodney H. Bonck
*Attorney, Agent, or Firm*—Marshall & Yeasting

[57] ABSTRACT

The invention provides a pipe jack for pulling a pipe lengthwise through the ground without the necessity of excavating the ground to create a trench first, the jack including a number of hydraulic rams coupled to a set of jaws, and the jaws being hydraulically displaceable to clamp a pipe disposed between them.

5 Claims, 4 Drawing Figures

3,952,384

PIPE JACKS

BACKGROUND OF THE INVENTION

This invention relates to pipe jacks, which are known devices for use in hauling pipes, cables and the like through the ground. By disconnecting a length of pipe or like at both ends, and then pulling the pipe lengthwise, the expense and labour of creating a trench, that is removing earth from above the pipe, can be avoided. In cases where the pipe runs below a surfaced road, pavement or the like, additional substantial costs in resurfacing are avoided. A new pipe may be installed in similar manner for example by attaching the same to the trailing end of the old pipe being removed, or by threading the new pipe into the orifice created by withdrawing the old pipe.

The known devices have comprised a screw operated vice for gripping the pipe, and attached to a hydraulic ram which is contracted to haul the vice and hence the pipe towards the stationary end of the ram.

SUMMARY OF THE INVENTION

The objects of the present invention are to provide an improved pipe jack.

In accordance with the present invention, a pipe jack comprises a number of fluid powered rams which extend between a fixed head and a movable head, the latter being provided with a plurality of jaws, each of said jaws being hydraulically displaceable to clamp a pipe or like disposed between the jaws.

Preferably the jaws are levers of the first order, being pivoted to the head, having a serrated or like gripping surface at a free end, and lying against hydraulically activated pistons housed in the head at their other ends: three equi-angularly spaced jaws being preferred.

The jaws may be spring returned from the hydraulically closed position by hairpin springs interposed between the head and the jaws, or for example by extensions of the lever ends coupled to tension springs.

Preferably also the movable head comprises a centreing device comprising a series of radially movable plungers which may be equi-spaced about the head and alternated with the jaws, and the plungers are associated with means for displacing all of them to similar radial positions together, so that pipes or like of different diameters can be accommodated in a single apparatus and to ensure that the jaws grip the pipe at equi-spaced positions, as a result of the centreing action of the plungers. The plunger displacing means are preferably manually operated.

Alternatively a more single centreing device may be provided comprising equi-spaced radially directed screws.

DESCRIPTION OF THE PREFERRED EMBODIMENTS

Figure 1:
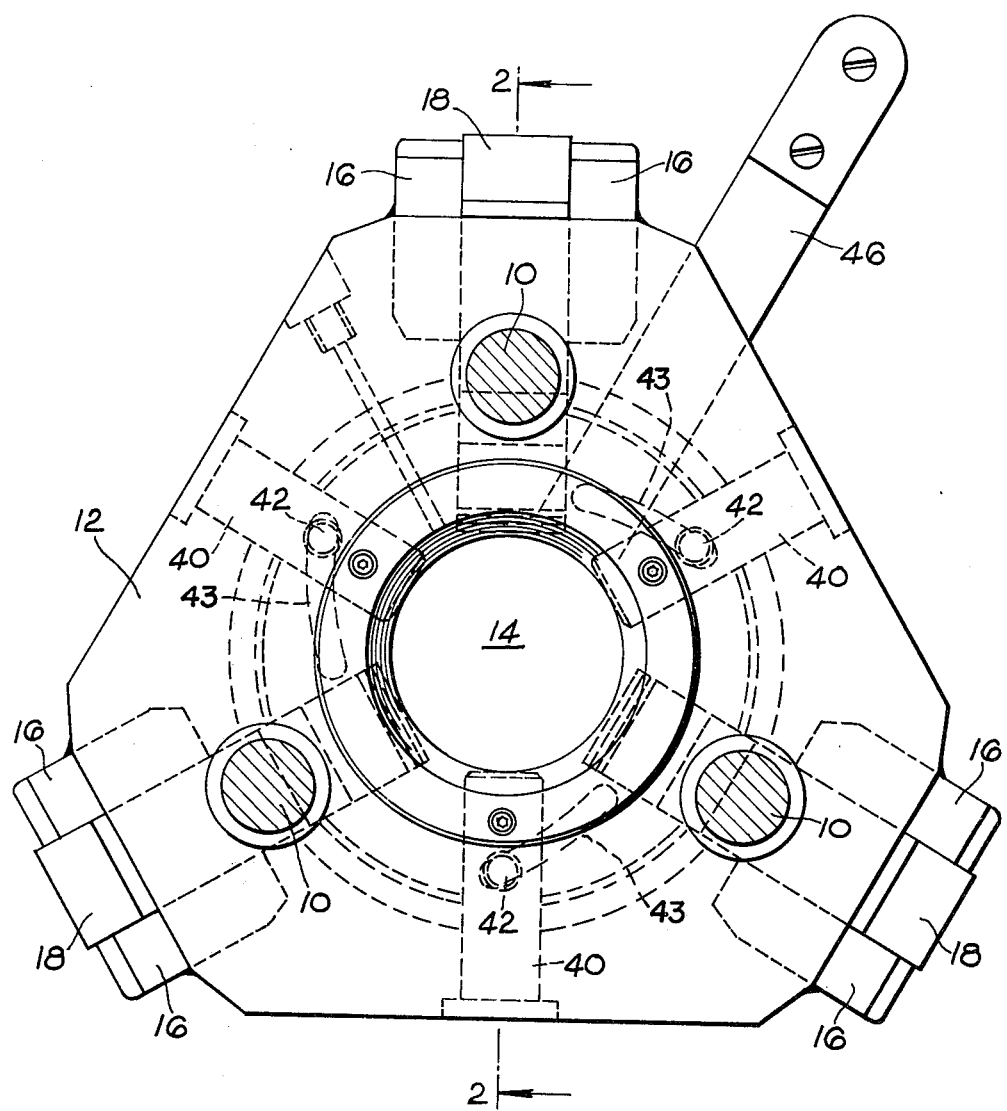
FIG. 1 is an elevation of the movable head of a pipe jack according to the invention.

Referring now to the drawings, the pipe jack comprises a skeleton frame provided with the fixed head at one end (not shown). The fixed head may comprise a plate with a central aperture through which the pipe passes in use, and which provides a mounting for three hydraulic rams which extend along the length of the frame, being equi-angularly spaced about the centre of the said aperture and with their axes parallel to the axis of the said aperture. Usually it will be the cylinders which are fixed to the fixed head, and the piston rods 10 are coupled to a movable head, although the reverse is possible.

The rams may be double acting hydraulic cylinders and such are preferred, although it may also be possible to use rams which are hydraulically extended and spring returned to the contracted position.

The movable head is an annular block 12, the central aperture or eye 14 of the annulus being co-axial with the aperture in the fixed head. Three pairs of lugs 16 are provided and each pair provides a pivotal mounting for a corresponding jaw lever 18, having one limb 20 which is arcuate at its end and transversely serrated at 22 so as to facilitate gripping movement with a tube or like disposed between the jaws.

The movable head is provided with a series of radially directed bores forming hydraulic cylinders, one such bore to each jaw, and the bores open at the outer periphery of the head and are closed towards the inner periphery of the annular head apart from a hydraulic connection 24 at that end as later described herein. Each bore houses a piston 26 with an O-ring or the like, and the outer ends of the bores have wiper seals 28. The pistons have domed ends to engage the shorter limbs 30 of the jaws, and the arrangement is such that as the pistons are displaced radially outwardly, the serrated ends of the jaws are swung generally inwardly to grip the pipe or like therebetween.

Hydraulic connection to all of the jaw displacing cylinders may be effected by an annular fluid passageway 32, which is connected to a control valve (not shown, conveniently mounted on the frame) by a flexible hose.

The arrangement thus far described provides for hydraulic closing of the jaws. If desired, a second set of pistons may be provided for hydraulic opening of the jaws, the hydraulic fluid connections between the pairs of cylinders being coupled by appropriate change over valves, or instead of the domed ends of the pistons abutting the shorter limbs of the jaw levers, the pistons could be connected to those levers by swinging links and the pistons could be arranged to be double-acting so that a single piston may open or close one jaw.

Figure 2:
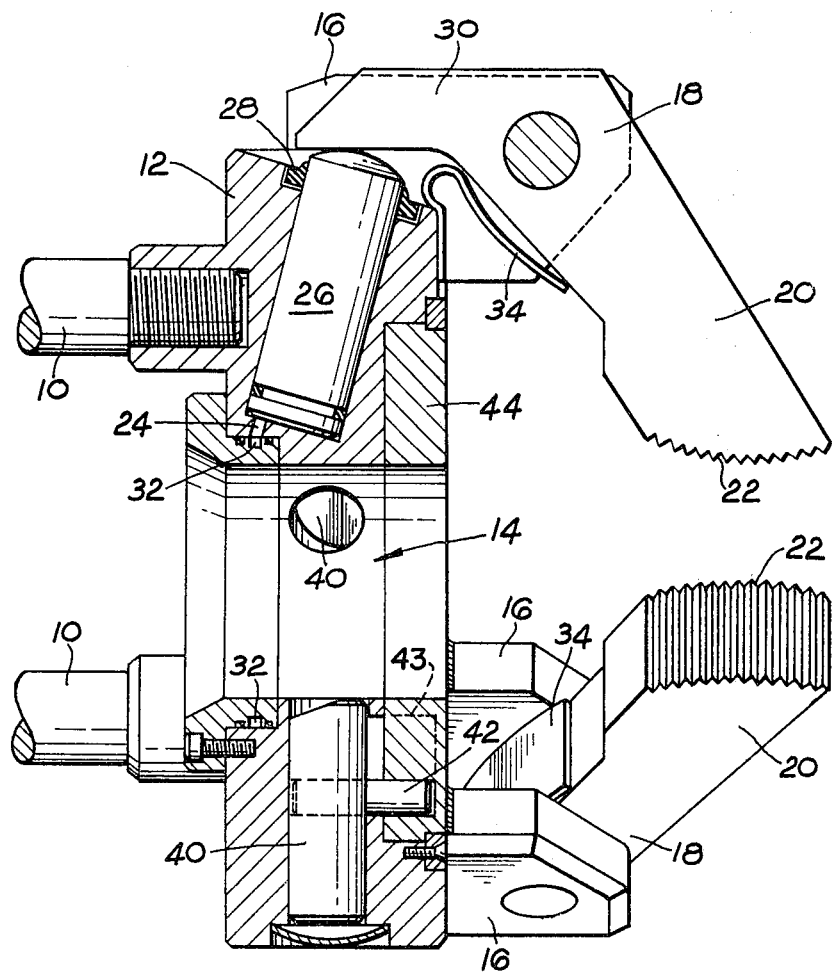
FIG. 2 is a sectional side view taken on the line 2—2 of FIG. 1.

However, it is presently preferred to use the described system and provide spring means for jaw opening after the hydraulic closing force has been released, and to this end according to FIG. 2 hairpin blade springs 34 or an assembly of several laminations forming hairpin blade springs may be trapped between the movable head and each jaw for this purpose.

The centreing device comprises three equi-angularly spaced plungers 40 which alternate with the pistons around the movable head. Each plunger carries a transverse pin 42 which projects through a slot in the head and is received in a cam slot 43 in a rotatable ring 44 journalled on the head. The ring carries a radially extending handle 46 for turning the ring, and by virtue of the profile of the cam slots this adjusts the pins and hence the plungers to different radial positions. The cam slot profile includes three equi-angularly spaced parts which are otherwise identical, and the ring handle is provided with detent means (not shown) registering with a stationary (i.e. non-rotatable) part of the movable head and the latter may be provided with a size indication adjacent each detent registration position so that the ring can be turned to centre all of the plungers for a particular pipe size.

As mentioned, the supply of hydraulic fluid to the jaw closing cylinders is under the control of a valve which may be mounted on the frame of the apparatus. The control of hydraulic fluid to the rams which displace the movable head towards and away from the fixed head may also be under the control of valves mounted on the frame, and it is preferred to provide combination valves so that a single control is moved in one direction to admit hydraulic fluid to the cylinders to close the jaws on the pipe or like, and subsequently to admit hydraulic fluid to the rams to draw the movable head towards the fixed head; movement of the same control member in the opposite direction (or movement of a second control member) may exhaust hydraulic fluid from the jaw closing cylinders and admit hydraulic fluid to the rams to displace them in the opposite direction, that is to displace the movable head away from the fixed head.

Hence, in use, the apparatus is located so that an extreme end of the pipe to be extracted is received within the aperture in the movable head and loosely between the jaws and plungers. The ring is then turned to the appropriate position so that the plungers centralise the pipe within the movable head but do not grip the pipe. Hydraulic fluid is then admitted to the cylinders to cause the jaws to swing into gripping engagement with the pipe, and also to the rams to expand the same so as to push the movable head with the pipe away from the fixed head. At the end of this operation, the fluid connections are changed over so that the jaws are released from gripping engagement (for example by the springs) and the movable head is returned to its starting position, whereupon a fresh cycle is commenced with the jaws engaging the pipe at a position displaced along the length of the latter from the initial position by a distance equal to the stroke of the rams. The cycle is repeated as often as necessary until the pipe has been extracted.

Hydraulic fluid may be supplied from a suitable power pack which may be located remote from the apparatus and connected thereto by high pressure hoses.

If desired, the change over valve may be made automatic so that the movable head is reciprocated back and forth and the jaws engaged and released in synchronism without the necessity for any manual control of the operating valves.

Figure 3:
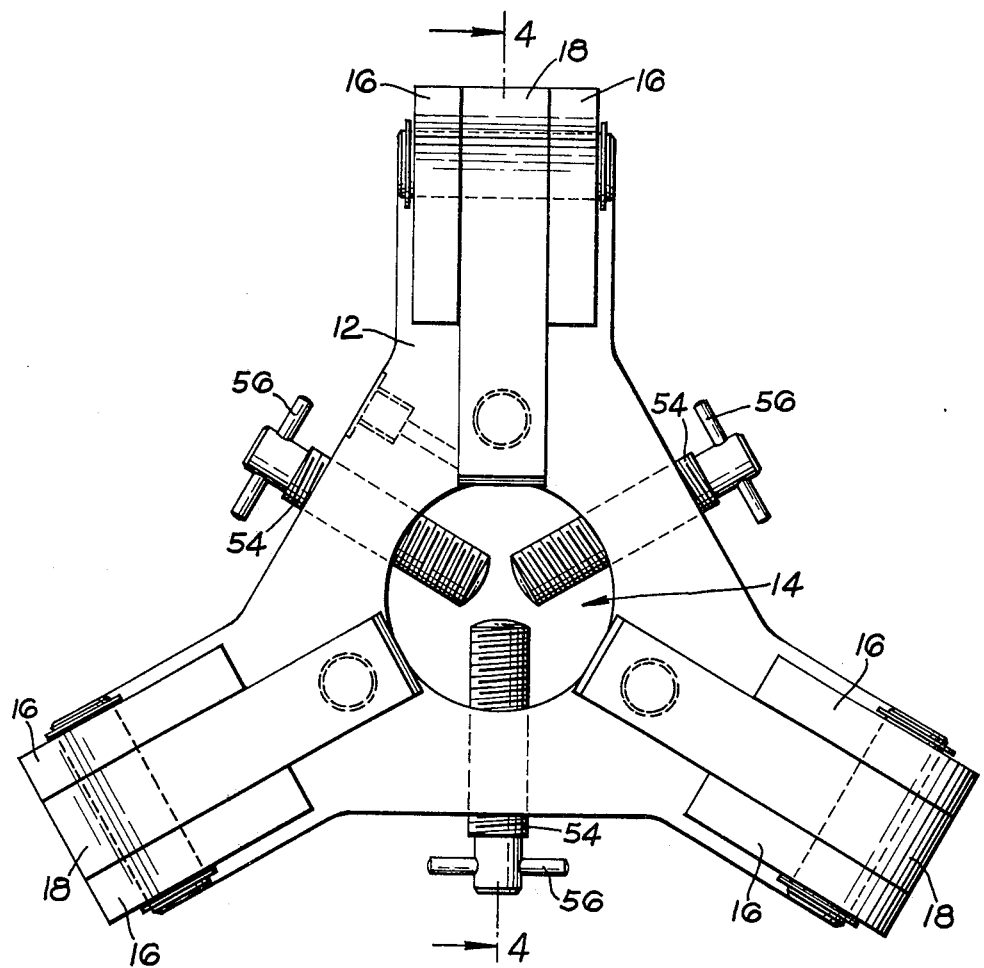
FIG. 3 is a view similar to FIG. 1 showing a modification.
Figure 4:
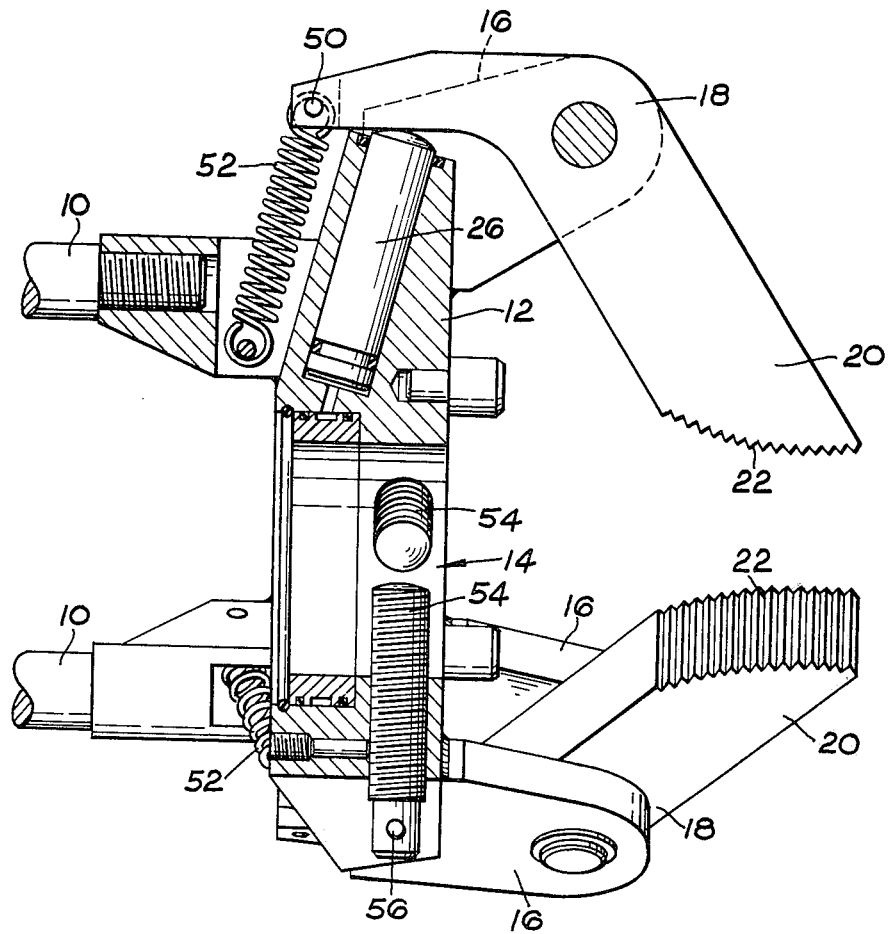
FIG. 4 is a section taken on the line 4—4 of FIG. 3.

In the arrangement shown in FIGS. 3 and 4, two changes are made. Firstly, the lever arms are extended to form anchorage points 50 coupling with tension springs 52 which are in turn anchored on lugs on the head so as to provide a spring retraction of the jaws to the fully open position when the hydraulic pressure which effects their closing is released. Secondly, the centreing system described with reference to FIGS. 1 and 2 is replaced by equi-spaced screws 54 engaging tapped holes in the head, and provided with tommy bars 56 at their ends to facilitate their rotation. It will be appreciated that this centreing system of FIGS. 3 and 4 is substantially cheaper to manufacture but much slower in use particularly when it is desired to ensure that the pipe or like is truly centred in the movable head. However, by actuating the jaws hydraulically to close them, the pipe or like may be substantially centred and then the screws adjusted until they are in close proximity to the pipe when they will, at least usually, be found to be adjusted to an equal radial projection in all three cases.

We claim:

1. An annular pass-through gripping head for a pipe jack, having minimal axial length to permit the head to be reciprocated with a maximum stroke, comprising a flat annular block having a central aperture adapted to surround a pipe, a plurality of jaws, each of which is pivoted to the block so as to swing substantially in a plane radial to the axis of said aperture, and each of which terminates in a pipe-gripping face, wherein the improvement comprises an arm integral with each jaw, which extends along the periphery of the block and is substantially parallel to said axis, a bore extending into the periphery of the block in a generally radial direction in alignment with each such arm, a passage in the block which is connected to supply hydraulic fluid to the inner end of each bore, and a piston in each bore for hydraulic actuation of the corresponding jaw.

2. A gripping head as claimed in claim 1 wherein each jaw is associated with spring means operative between the annular head and the jaw, which is stressed when the jaw is closed and is effective to return the jaw when hydraulic pressure is relieved.

3. A gripping head as claimed in claim 2 wherein the spring means are hairpin springs each having one limb located against a face of the annular head and a second limb located against an adjacent face of the gripping portion of the corresponding jaw, so that said limbs are close together when the jaw is closed.

4. A gripping head as claimed in claim 2 wherein a portion of each jaw extends beyond the corresponding piston to a free end, and the free end is connected to the annular head by an interposed tension spring.

5. A gripping head as claimed in claim 1 which further comprises a centering device consisting of a series of radially movable plungers provided in the annular head and adjustable towards and away from the axis of the central aperture.

* * * * *